Patented Sept. 28, 1937

2,094,125

UNITED STATES PATENT OFFICE 2,094,125

FROTH-FLOTATION CONCENTRATION OF ORES

Cornelius H. Keller, San Francisco, Calif., assignor to Minerals Separation North American Corporation, New York, N. Y., a corporation of Maryland No Drawing. Application December 6, 1927, Serial No. 238,231

4 Claims. (Cl. 209—166)

This invention relates to the froth flotation concentration of ores and is herein described as applied when there is used as an agent, material containing the compounds obtained when a hydrocarbon which may be a cyclic hydrocarbon, is caused to react with sulphur in the presence of a metallic element and chlorine. The chlorine, the sulphur, and the metallic element may be variously combined as will appear below. The invention is further described in some detail as carried out with phenyl sulphide, one of the compounds usually obtained under the described conditions of preparing the agent. Phenyl sulphide is a compound of the type $R_2S$ wherein R is a cyclic hydrocarbon radical.

One agent was prepared by boiling under a reflux condenser for eight hours,

| | Grams |
|---|---|
| Benzene | 100 |
| Sulphur chloride ($S_2Cl_2$) | 40 |
| Zinc (40 mesh-metallic) | 40 |

This after separating the solids and the greater part of the unchanged benzene, yielded a yellow liquid, equal to about 12% of the benzene used, boiling at 290° to 310° C. This liquid was a crude phenyl sulphide.

65-mesh Anaconda copper ore table tailings were made into a pulp with water, and four pounds per ton of hydrated lime was added. Then was added one pound of the yellow liquid produced as above described and 0.32 pound of steam distilled pine oil, both per ton of tailings.

Agitation was carried on in a subaeration test machine and continued for ten minutes and a froth removed for four minutes, giving a recovery of 92.2%. The results are summarized in the following table:

| Concentrate weight | Copper assays | | |
|---|---|---|---|
| | Heads | Concentrate | Tailings |
| 19.2% | 1.56% | 7.47% | 0.15% |

Analagous results, though not as efficient, were obtained when using the reagent resulting from boiling for one hour under a reflux condenser:

| | Grams |
|---|---|
| Benzene | 120 |
| Sulphur | 12 |
| Aluminum chloride (anhydrous) | 25 |

A similar yellow liquid was obtained, apparently containing phenyl sulphide and useful as a flotation agent. It was found that when a larger proportion of sulphur was used in connection with the aluminum chloride, the yield of phenyl sulphide was reduced and sizable amounts of other products obtained, with the result that the reaction product was of less value as a froth-flotation agent with some ores.

Substantially pure phenyl sulphide was used as a froth-flotation agent as follows:

Utah Copper Co. ore was reground eight minutes in a ball mill with four pounds of calcium oxide per ton, and then made into a pulp with water, agitated in a subaeration test machine for ten minutes with 0.5 pound of cresol, 0.12 pound of steam distilled pine oil, and one pound of phenyl sulphide, all per ton of ore, and a froth removed for six minutes. The recovery was 84.8%. The results are summarized in the following table:

| Concentrate weight | Copper assays | | |
|---|---|---|---|
| | Heads | Concentrate | Tailings |
| 6.80% | 1.35% | 16.80% | 0.22% |

An agent was prepared by boiling under a reflux condenser.

| | Grams |
|---|---|
| N-heptane | 20 |
| Sulphur chloride | 6.3 |
| Zinc (metallic) | 6.3 |

The liquid reaction product was used in the concentration of Utah Copper Company ore as follows:

The ore was reground in a ball mill with 4 pounds per ton of calcium oxide, made into a pulp with water and agitated in a subaeration test machine for ten minutes with 0.5 pound of the liquid reaction product, 0.25 pound of cresol, and 0.06 pound of steam distilled pine oil, all per ton of ore, and a froth removed for six minutes. The recovery was 80.9%. The results are shown in the following table:

| Weight concentrate | Copper assays | | |
|---|---|---|---|
| | Heads | Concentrate | Tailings |
| 6.03% | 1.28% | 17.12% | 0.26% |

An agent was prepared by boiling under a reflux condenser for one hour:

|  | Grams |
|---|---|
| Benzene | 75 |
| Aluminum chloride (anhydrous) | 25 |
| Sulphur (powder) | 20 |

The Utah Copper Co. ore was ground for ten minutes in a ball mill with 0.35 pound of the reaction mixture and 5 pounds of calcium oxide to 100-mesh, both per ton of ore, and then made into a pulp with water and a froth concentrate separated in a subaeration spitzkasten test machine during agitation with 0.4 pound of cresylic acid and 0.15 pound of steam distilled pine oil, both per ton of ore. The results are shown in the following table:

| | Weight | Assays | | Recoveries | |
|---|---|---|---|---|---|
| | | Cu | Fe | Cu | Fe |
| | Percent | Percent | Percent | Percent | Percent |
| Heads | 100 | 1.31 | 1.63 | 100 | 100 |
| Concentrate | 6.5 | 17.28 | 9.2 | 85.7 | 36.7 |
| Tailings | 93.5 | 0.2 | 1.1 | 14.3 | 63.3 |

In another test the same ore was similarly ground with lime, and the same reaction product was first dissolved in the cresylic acid and added to the pulp in a subaeration spitzkasten test machine. A heavy froth was then obtained which was stiffened upon the addition of the same amount of pine oil as in the other test. The results of this test are shown in the following table:

| | Weight | Assays | | Recoveries | |
|---|---|---|---|---|---|
| | | Cu | Fe | Cu | Fe |
| | Percent | Percent | Percent | Percent | Percent |
| Heads | 100 | 1.29 | 1.59 | 100 | 100 |
| Concentrate | 8.4 | 13.68 | 7 | 89.4 | 36.8 |
| Tailings | 91.6 | 0.15 | 1.1 | 10.6 | 63.2 |

Having thus described certain embodiments of my invention, what I claim is:

1. The process of concentrating an ore by froth-flotation which consists in agitating and aerating a pulp of the ore with an agent obtained by effecting a reaction between a liquid cyclic hydrocarbon and sulphur chloride in the presence of zinc, under such conditions that a froth concentrate is obtained, and separating the froth.

2. The process of concentrating an ore by froth-flotation which consists in agitating and aerating a pulp of the ore with an agent substantially dependent upon the presence of phenyl sulphide and with a mineral-frothing agent, so that a froth concentrate is obtained, and separating the froth.

3. In the concentration of ores, the process which comprises subjecting an ore pulp to a froth flotation operation in the presence of a composition comprising a liquid composite condensation organic product derived from benzene, sulphur, and aluminum chloride.

4. In the concentration of ores, the process which comprises subjecting an ore pulp containing copper sulphide to a froth flotation operation in the presence of an organic product derivable by interaction of benzene with sulphur in the presence of anhydrous aluminum chloride.

CORNELIUS H. KELLER.